(12) United States Patent
Ishikawa et al.

(10) Patent No.: US 7,930,180 B2
(45) Date of Patent: Apr. 19, 2011

(54) SPEECH RECOGNITION SYSTEM, METHOD AND PROGRAM THAT GENERATES A RECOGNITION RESULT IN PARALLEL WITH A DISTANCE VALUE

(75) Inventors: Shinya Ishikawa, Tokyo (JP); Kiyoshi Yamabana, Tokyo (JP)

(73) Assignee: NEC Corporation, Tokyo (JP)

( * ) Notice: Subject to any disclaimer, the term of this patent is extended or adjusted under 35 U.S.C. 154(b) by 970 days.

(21) Appl. No.: 11/793,806

(22) PCT Filed: Jan. 12, 2006

(86) PCT No.: PCT/JP2006/300269
§ 371 (c)(1),
(2), (4) Date: Jun. 22, 2007

(87) PCT Pub. No.: WO2006/075648
PCT Pub. Date: Jul. 20, 2006

(65) Prior Publication Data
US 2008/0133237 A1      Jun. 5, 2008

(30) Foreign Application Priority Data
Jan. 17, 2005    (JP) ................ 2005-008542

(51) Int. Cl.
*G10L 15/10* (2006.01)
(52) U.S. Cl. .................................... 704/251
(58) Field of Classification Search .............. 704/251
See application file for complete search history.

(56) References Cited

U.S. PATENT DOCUMENTS

| 4,742,547 | A | * | 5/1988 | Watanabe | 704/241 |
| 4,975,959 | A | * | 12/1990 | Benbassat | 704/240 |
| 4,989,249 | A | * | 1/1991 | Oka et al. | 704/251 |
| 5,241,649 | A | * | 8/1993 | Niyada | 704/234 |
| 6,249,761 | B1 | | 6/2001 | Phillips et al. | |
| 6,442,520 | B1 | | 8/2002 | Buhrke et al. | |
| 7,548,651 | B2 | * | 6/2009 | Shozakai et al. | 382/224 |

FOREIGN PATENT DOCUMENTS

| GB | 2 391 679 A | 2/2004 |
| JP | 63-208138 | 8/1988 |

(Continued)

OTHER PUBLICATIONS

S. Ortmanns et al., "Look-Ahead Techniques for Fast Beam Search," 1997 International Conference on Acoustics Speech and Signal Processing, Apr. 1997, vol. 3, pp. 1783-1786.

(Continued)

*Primary Examiner* — Susan McFadden
(74) *Attorney, Agent, or Firm* — Foley & Lardner LLP (57) ABSTRACT

Speech recognition is performed at high speed by processing respective paths of multi-path speech recognition in parallel. A distance calculation unit receives temporal data sequence of acoustic features, calculates the distance values between all acoustic models and the speech features in the respective frames, and writes them in a distance value buffer. An acoustic lookahead unit receives distance values from a plurality of distance value buffers, calculates lookahead values which are relative priorities of respective recognition units, and writes them into the lookahead value buffer. A word string matching unit receives information from a plurality of distance value buffers and the lookahead value buffers, and recognizes the entire utterance in frame synchronization by adequately selecting matching words using the lookahead values to thereby generate a recognition result.

16 Claims, 8 Drawing Sheets

FOREIGN PATENT DOCUMENTS

| JP | 03-045840 | 7/1991 |
| JP | 04-232998 | 8/1992 |
| JP | 06-214595 | 8/1994 |
| JP | 7-200372 | 8/1995 |
| JP | 2000-206984 A | 7/2000 |
| JP | 3226716 | 8/2001 |
| JP | 2003-029781 A | 1/2003 |
| WO | WO 03/036618 A1 | 5/2003 |

OTHER PUBLICATIONS

T. Hori et al., "A Study on a Phoneme-graph-based Hypothesis Restriction for Large Vocabulary Continuous Speech Recognition," Transactions of Information Processing Society of Japan, Apr. 1999, vol. 40, No. 4, pp. 1365-1373.

J. Jou et al., "An efficient VLSI Architecture for HMM-Based Speech Recognition," The 8$^{th}$ IEEE International Conference on Electronics, Circuits and Systems (ICECS 2001), Sep. 2001, vol. 1, pp. 469-472.

S. Ortmanns et al., "Look-Ahead Techniques for Fast Beam Search," 1997 International Conference on Acoustics Speech and Signal Processing, Apr. 1997, vol. 3, pp. 1783-1786.

\* cited by examiner

SPEECH RECOGNITION SYSTEM, METHOD AND PROGRAM THAT GENERATES A RECOGNITION RESULT IN PARALLEL WITH A DISTANCE VALUE

BACKGROUND OF THE INVENTION

1. Field of the Invention

The present invention relates to a speech recognition system, a speech recognition method and a speech recognition program, suitable for large vocabulary continuous speech recognition (LVCSR) with high accuracy and at high speed.

2. Related Art

Figure 5:
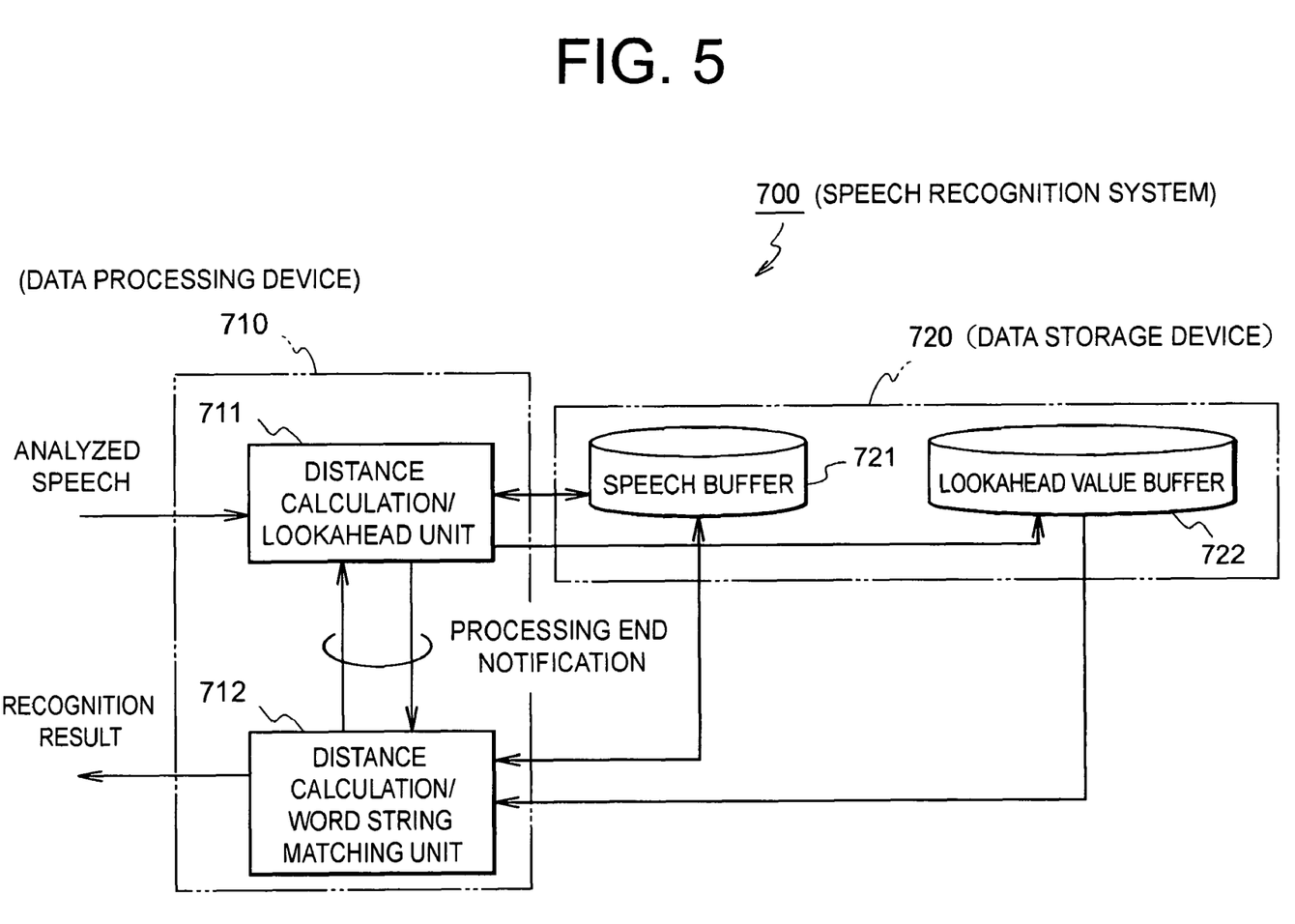
FIG. 5 is a block diagram showing the first conventional example of a speech recognition system.

As described in Non-Patent Document 1, attempts to realize highly-accurate and high-speed LVCSR are carried out actively in recent years. In the LVCSR, the search space becomes very large, so search algorithm design is important. In the search algorithm, a method called "acoustic lookahead" (hereinafter, referred to as "lookahead") has been widely known, in which not only accumulated score up to a node on the trellis but also accumulated score (estimated value thereof) after the node is taken into consideration. FIG. 5 shows a speech recognition system relating to this art as a first conventional example. Hereinafter, description will be given based on FIG. 5.

A speech recognition system 700 of the first conventional example includes a data processor 710 and a data storage device 720. The data storage device 720 includes a speech buffer 721 in which speeches having a plurality of frames are accumulated, and a lookahead value buffer 722 in which lookahead values of speeches which are created by processing in a reverse direction with respect to the speeches accumulated in the speech buffer 721 are stored. The data processor 710 includes a distance calculation/lookahead unit 711 which creates lookahead values and stores them in the lookahead buffer 722, and a distance calculation/word string matching unit 712 which performs general word matching processing by using values in the speech buffer 721 and the lookahead value buffer 722.

The speech recognition system 700 operates as follows. First, the distance calculation/lookahead unit 711 operates as follows. That is, the distance calculation/lookahead unit 711 waits until temporal data sequence of inputted speech features is accumulated in the speech buffer 721, and then processes the speech data in a temporally-reverse order to thereby create lookahead values for the respective frames, and accumulates them in the lookahead value buffer 722. When processing of the speech buffer 721 is completed, it notifies the distance calculation/word string matching unit 712 of that fact. Then, the distance calculation/word string matching unit 712 operates as follows. That is, the distance calculation/word string matching unit 712 performs continuous word matching with reference to the speech buffer 721 and the lookahead value buffer 722, and when the processing of the speech buffer 721 and the lookahead value buffer 722 is completed, it notifies the distance calculation/lookahead unit 711 of that fact. Then, the distance calculation/lookahead unit 711 waits again until the data is accumulated in the speech buffer 721, and repeats the same processing. The continuous word matching result is held in the distance calculation/word string matching unit 712, and the result is outputted when all speech data has been processed.

Figure 6:
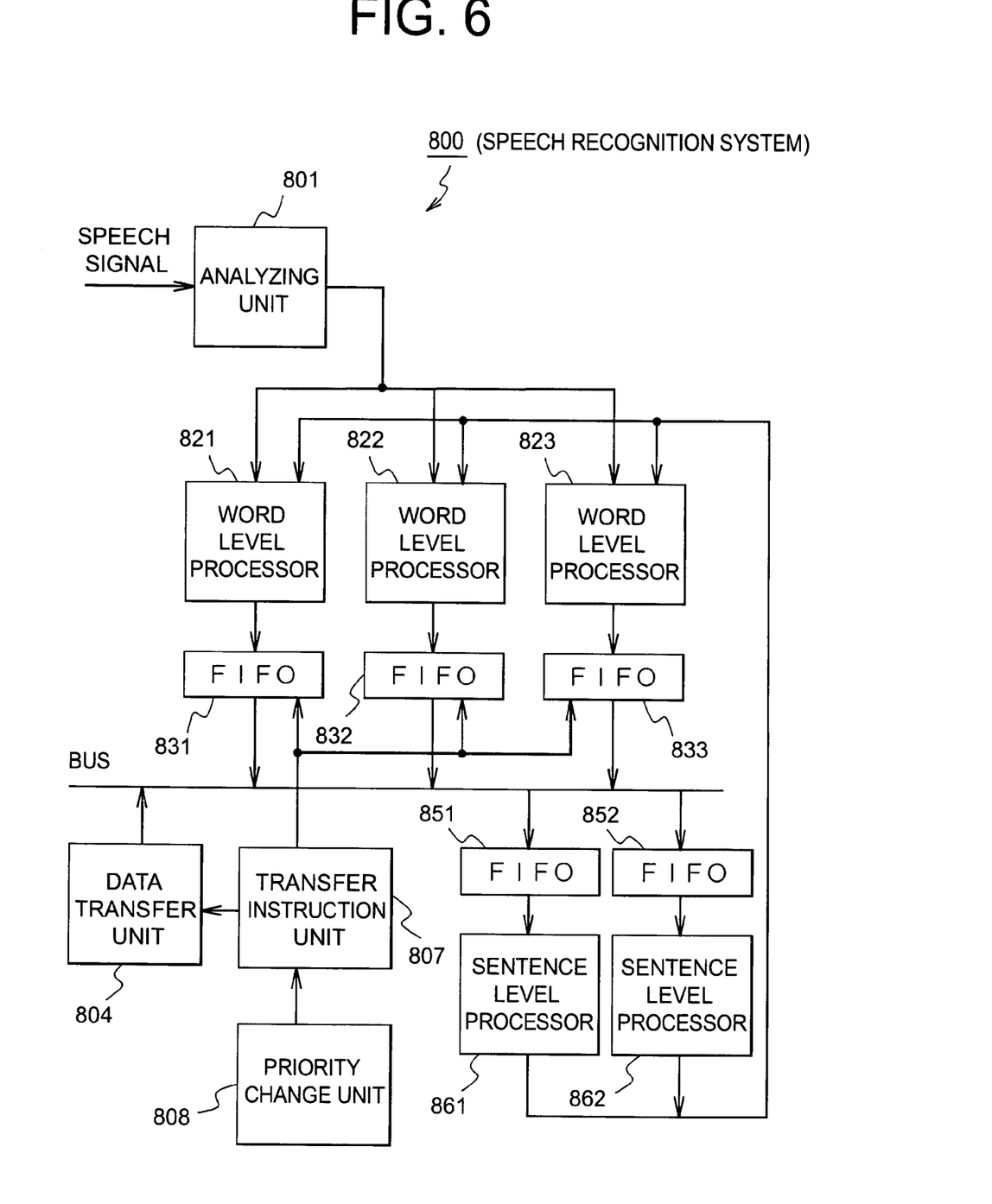
FIG. 6 is a block diagram showing the second conventional example of a speech recognition system.

Next, FIG. 6 shows a speech recognition system described in Patent Document 1, as a second conventional example. Hereinafter, description will be given based on FIG. 6.

A speech recognition system 800 of the second conventional example has three-stage processing units including an analyzer 801, a plurality of word level processors 821 to 823, a plurality of sentence level processors 861 and 862. According to the speech recognition system 800, each of the word level processors 821 to 823 and each of the sentence level processors 861 and 862 perform input and output synchronously with the speech signal inputted into the analyzer 801, that is, perform parallel processing. Thereby, processing can be performed at a higher speed than the case where the whole processing is performed by a single processor. The reference numeral 804 denotes a data transfer unit, 807 denotes a transfer instruction unit, 808 denotes a priority change unit, and 831, 832, 833, 851 and 852 denote FIFO.

Non-Patent Document 1: "A Study on a Phoneme-graph-based Hypothesis Restriction for Large Vocabulary Continuous Speech Recognition", by Takaaki Hori, Naoki Oka, Masaharu Katoh, Akinori Ito and Masaki Kohda, Information Processing Society of Japan Journal, vol. 40, No. 4, April 1999

Patent Document 1: Japanese Patent Application Laid-Open No. 4-232998, "SPEECH RECOGNITION DEVICE"

DISCLOSURE OF THE INVENTION

Problems to be Solved by the Invention

However, a problem of the first conventional example is that processing is performed sequentially by one processing unit, so the recognition speed is insufficient with a low-power CPU for embedded appliances. If it is performed by a plurality of processing units as the second conventional example, high-speed processing can be expected, but the second conventional example is based on the premise that processing is performed in frame synchronization. Therefore, in the first conventional example including lookahead processing in which a plurality of frames are stored in the buffer and then processing must be done in a temporally-reverse order, the method of the second conventional example cannot be applied directly.

It is therefore an object of the present invention to provide a speech recognition system and the like, capable of performing recognition at a higher speed by realizing parallelization in a speech recognition system corresponding to the first conventional example.

Means for Solving the Problems

Figure 7:
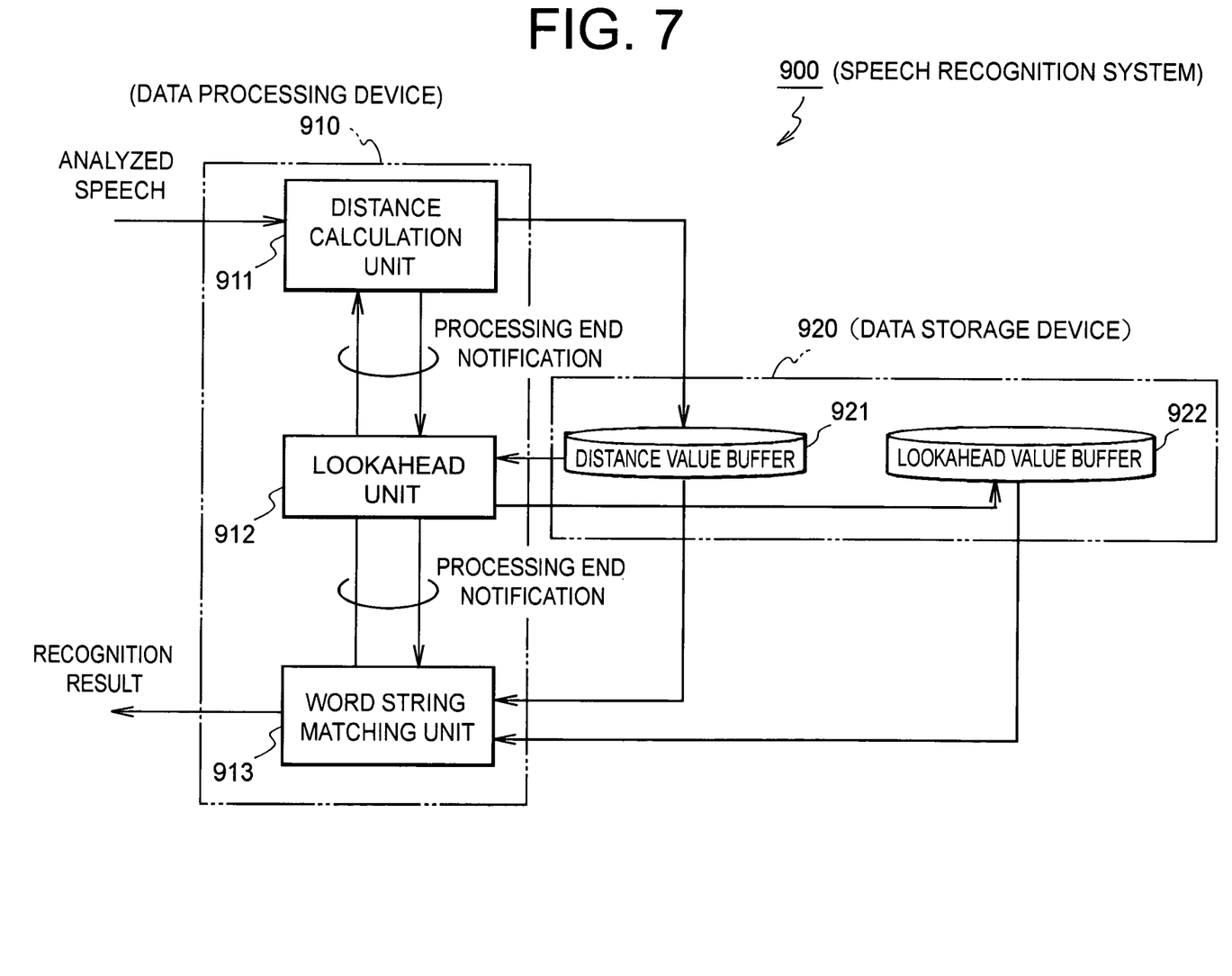
FIG. 7 is a block diagram showing a speech recognition system which is the premise of the present invention.
Figure 8:
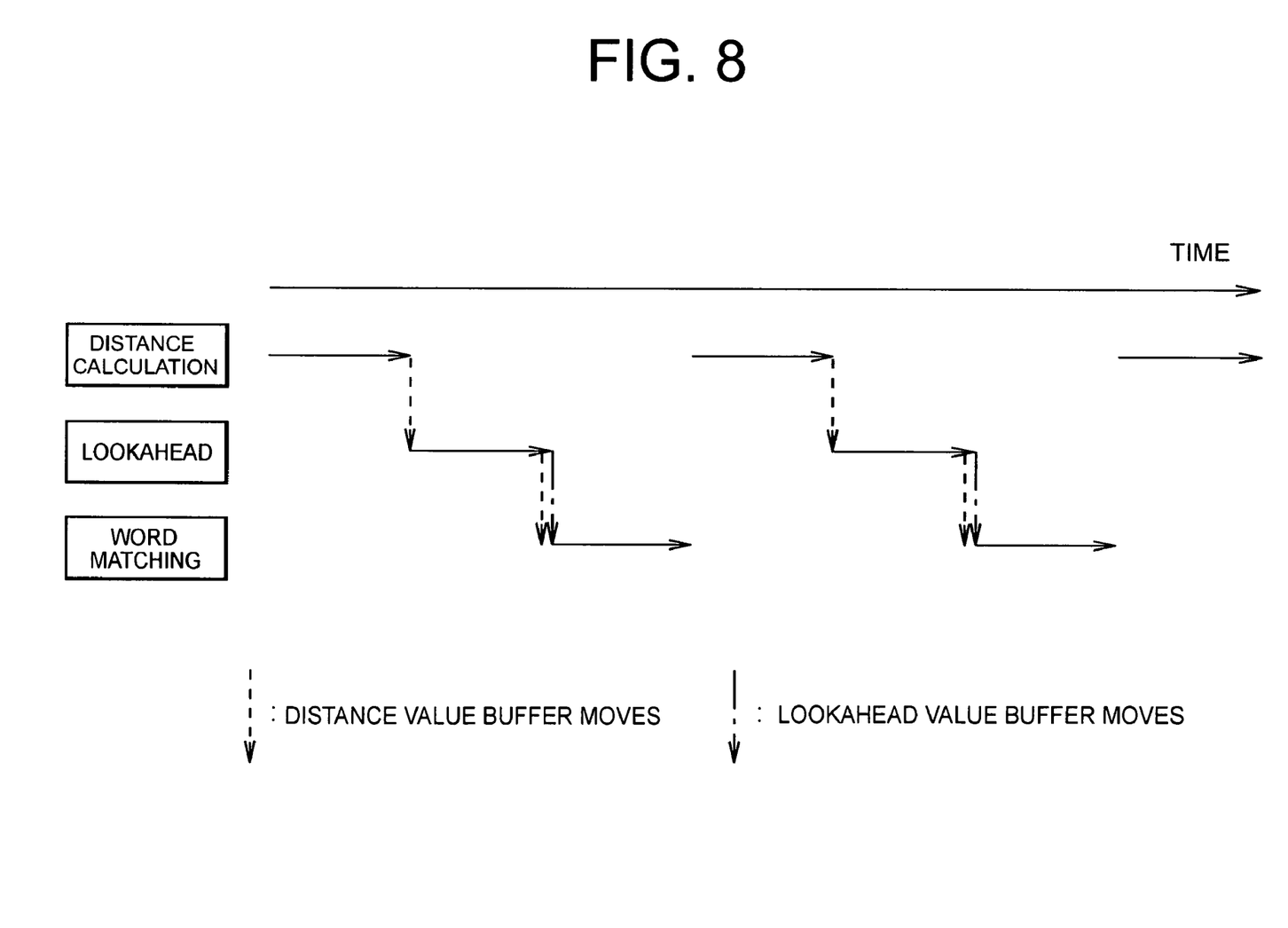
FIG. 8 is a time chart showing the operation of the speech recognition system of FIG. 7.

FIG. 7 shows a speech recognition system which is the premise of the present invention. Hereinafter, description will be given based on FIG. 7. A speech recognition system 900 includes a data processor 910 and a data storage device 920. The data processor 910 includes a distance calculation unit 911, a lookahead unit 912 which only performs acoustic lookahead, and a word string matching unit 913 which performs word matching. The data storage device 920 includes a distance value buffer 921 and a lookahead value buffer 922, capable of accommodating a plurality of frames. The distance calculation unit 911 calculates distance values with respect to all acoustic models, and the lookahead unit 912 and the word string matching unit 913, in a later stage, do not additionally perform distance calculation. However, the speech recognition system 900 of this kind can perform only one processing at a time as shown in the time chart of FIG. 8.

In view of the above, a speech recognition system according to the present invention includes: a distance calculation unit which generates distance values between sequentially inputted speech features and acoustic models; a lookahead unit which generates lookahead values by using the distance values previously generated by the distance calculation unit, in parallel with generation of the distance values by the distance calculation unit; a word string matching unit which performs word matching by using the distance values previously generated by the distance calculation unit and the lookahead values previously generated by the lookahead unit to thereby generate a recognition result, in parallel with generation of the distance values by the distance calculation unit and generation of the lookahead values by the lookahead unit. As described above, three units can perform processing in parallel, which enables to perform speech recognition at high speed.

For example, the speech recognition system may include multiple distance value buffers which store distance values generated by the distance calculation unit, and multiple lookahead value buffers which store lookahead values generated by the lookahead unit. In each of the distance value buffers, operations of writing the distance value by the distance calculation unit, then reading out the distance value by the lookahead unit, and then reading out the distance value by the word string matching unit may be performed. In each of the lookahead value buffers, operations of writing the lookahead value by the lookahead unit and then reading out the lookahead value by the word string matching unit may be performed. The distance value buffer into which the distance value from the distance calculation unit is written, the distance value buffer from which the distance value to the lookahead unit is read out, and the distance value buffer from which the distance value to the word string matching unit is read out, may be different from one another. Further, the lookahead value buffer into which the lookahead value is written by the lookahead unit and the lookahead value buffer from which the lookahead value is read out by the word string matching unit may be different from each other.

The speech recognition system may further include a buffer length determination unit which determines the buffer length of the distance value buffer or the lookahead value buffer so that processing amounts of the distance calculation unit, the lookahead unit and the word string matching unit become uniform. In this case, the optimum buffer length with respect to the speed is determined by the buffer length determination unit. Therefore, recognition speed is improved.

The speech recognition system may further include a buffer management unit which monitors operations of the distance calculation unit, the lookahead unit and the word string matching unit. When the distance calculation unit cannot write the distance values in the distance value buffers any more, and when the lookahead unit and the word string matching unit read out all of the distance values from the distance value buffers, and when the lookahead unit cannot write the lookahead values in the lookahead value buffers any more, and when the word string matching unit reads out all of the lookahead values from the lookahead value buffers, the buffer management unit causes the distance value buffer used for writing by the distance calculation unit to be used as the next one for reading by the lookahead unit, causes the distance value buffer used for reading by the lookahead unit to be used as the next one for reading by the word string matching unit, causes the distance value buffer used for reading by the word string matching unit to be used as the next one for writing by the distance calculation unit, causes the lookahead value buffer used for writing by the lookahead unit to be used as the next one for reading by the word string matching unit, and causes the lookahead value buffer used for reading by the word string matching unit to be used as the next one for writing by the lookahead unit. In such a case, the effect of the present invention can be achieved with the minimum number of buffers.

A speech recognition method according to the present invention includes: a distance calculation step to generate distance values between sequentially inputted speech feature and respective acoustic models; a lookahead step to generate lookahead values by using the distance values previously generated in the distance calculation step, in parallel with generation of the distance values in the distance calculation step; a word string matching step to perform word matching by using the distance values previously generated in the distance calculation step and the lookahead values previously generated in the lookahead step and to generate a recognition result, in parallel with generation of the distance values in the distance calculation step and generation of the lookahead values in the lookahead step.

A speech recognition program according to the present invention causes a computer constituting a speech recognition system to perform: a function of generating distance values between sequentially inputted speech features and respective acoustic models; a function of generating lookahead values by using the distance values previously generated, while the distance values are being continuously generated; and a function of performing word matching by using the distance values previously generated and the lookahead values previously generated to generate a recognition result, while the distance values and the lookahead values are being continuously generated.

Further, a first speech recognition system of the present invention is a system including: lookahead buffers and distance value buffers capable of accommodating a plurality of frames on a shared memory; and units for performing distance calculation, lookahead and speech recognition, and to perform three-parallel processing, like batch processing, in which a plurality of frames can be stored in the three units in the units of buffers. A second speech recognition system of the present invention further includes a buffer length determination unit, in addition to the first speech recognition system. The buffer length determination unit performs communications with the distance calculation unit, the lookahead unit and the speech recognition unit to thereby determine the buffer length used in the distance calculation unit, the lookahead unit and the speech recognition unit.

Further, the speech recognition system may include a distance calculation unit, a lookahead unit and a word string matching unit, which operate in parallel. Further, the speech recognition system may include a plurality of distance value buffers and lookahead value buffers, and different buffers may be used in the distance calculation unit, the lookahead unit and the word string matching unit, and processed buffers may be transferred from the distance calculation processing to the lookahead processing and from the lookahead processing to the word string matching processing so as to perform parallel processing. Further, the speech recognition system may be a system including a buffer length determination unit which communicates with the distance calculation unit, the lookahead unit and the word string matching processing to thereby determine the buffer length.

EFFECTS OF THE INVENTION

According to the present invention, processing to generate distance values between speech features inputted sequentially and respective acoustic models, processing to generate lookahead values by using the distance values previously generated, and processing to perform word matching by using the distance values previously generated and the lookahead values previously generated to thereby generate a recognition result, can be performed in parallel. Thereby, multiple numbers of processing can be performed in parallel. This enables to improve the speech recognition speed.

BEST MODE FOR CARRYING OUT THE INVENTION

Figure 1:
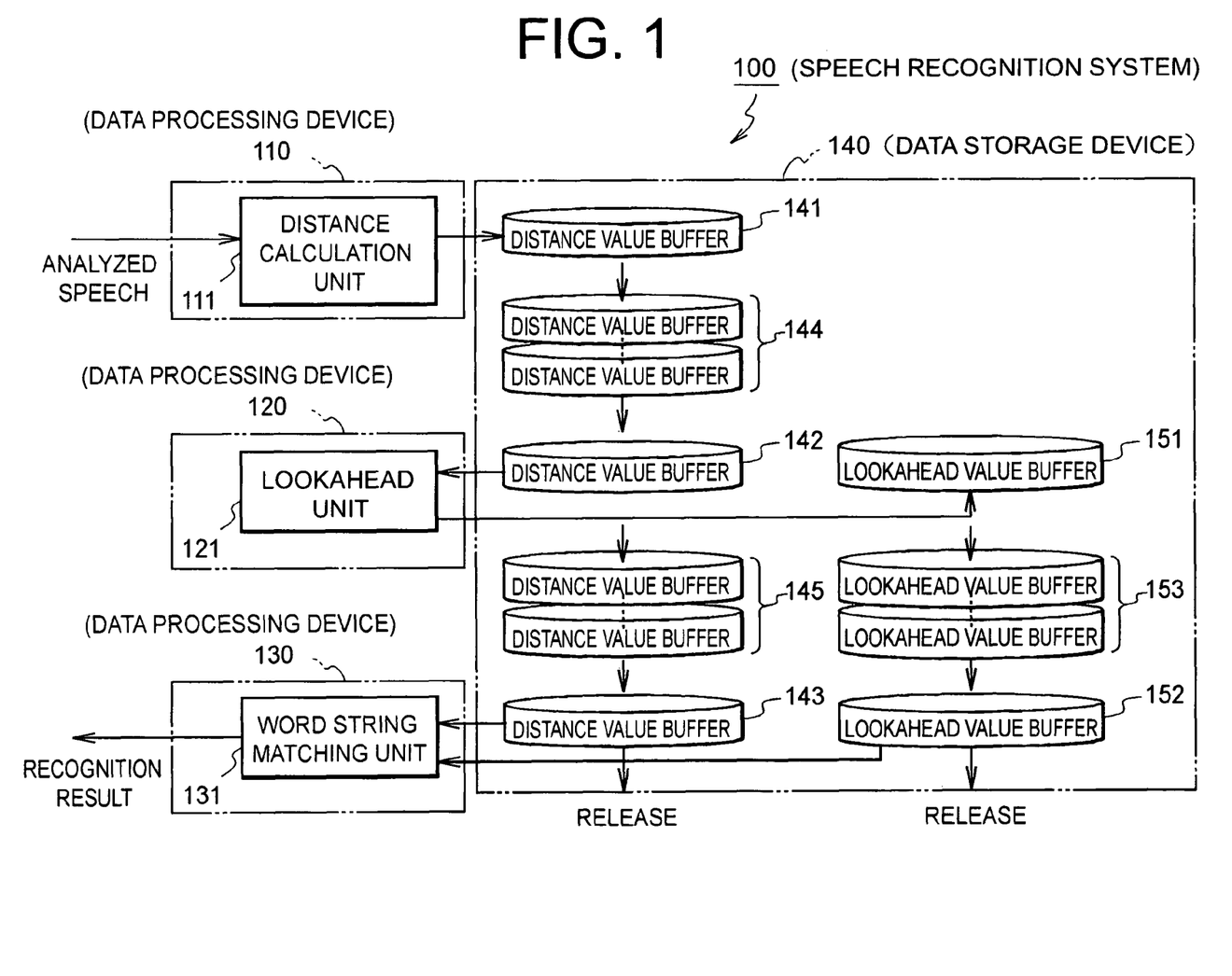
FIG. 1 is a block diagram showing the first embodiment of the speech recognition system according to the present invention.

FIG. 1 is a block diagram showing a first embodiment of a speech recognition system according to the present invention. Hereinafter, description will be given based on FIG. 1.

A speech recognition system 100 of the present embodiment is characterized as to include a distance calculation unit 111, a lookahead unit 121 and a word string matching unit 131. The distance calculation unit 111 generates distance values between speech features inputted sequentially and the acoustic models. The lookahead unit 121 generates lookahead values using the distance values previously generated by the distance calculation unit 111 while the distance calculation unit 111 is generating distance values. The word string matching unit 131 performs word matching using the distance values previously generated by the distance calculation unit 111 and the lookahead values previously generated by the lookahead unit 121, and generates recognition results, while the distance calculation unit 111 is generating distance values and the lookahead unit 121 is generating lookahead values. As described above, three units perform processing in parallel, which enables high-speed speech recognition.

Further, the speech recognition system 100 includes a plurality of distance value buffers 141 to 145 for storing distance values generated by the distance calculation unit 111, and a plurality of lookahead value buffers 151 to 153 for storing lookahead values generated by the lookahead unit 121. As for the respective distance buffers 141 to 145, distance values are written by the distance calculation unit 111, and then distance values are read by the lookahead unit 121, and then the distance values are read by the word string matching unit 131. As for the respective lookahead buffers 151 to 153, lookahead values are written by the lookahead unit 121, and then lookahead values are read by the word string matching unit 131. The distance value buffer 141 to which the distance calculation unit 111 is writing a distance value, the distance value buffer 142 from which the lookahead unit 121 is reading a distance value, and the distance value buffer 143 from which the word string matching unit 131 is reading a distance value, at a time, are different respectively. The lookahead value buffer 151 to which the lookahead unit 121 is writing a lookahead value and the lookahead value buffer 152 from which the word string matching unit 131 is reading a lookahead value are different.

Description will be given in more detail. The speech recognition system 100 of the present embodiment includes data processing devices 110, 120 and 130 operated by program controls, and a data storage device 140 which stores information. The data processing devices 110, 120 and 130 have different processors respectively, so parallel processing is possible. Note that the data processing devices may be formed as a single device by using a processor capable of parallel processing.

The data storage device 140 includes the distance value buffers 141, 142 and 143, the lookahead value buffers 151 and 152, 0 or more numbers of distance value buffers 144, 0 or more numbers of distance value buffers 145, and 0 or more numbers of lookahead value buffers 153. The buffer number of the distance value buffer 145 and the buffer number of the lookahead value buffer 153 are the same. Each of the distance value buffers 141 to 145 is a buffer corresponding to the speech of a frame section, storing a distance values between acoustic models and speech features inputted in each frame. Each of the lookahead value buffers 151 to 153 is a buffer corresponding to the speech and the distance value of a frame section, storing lookahead values that are relative priorities for respective recognition units calculated in each frame from acoustic information after the frame.

The data processing device 110 has the distance calculation unit 111, and the data processing device 120 has the lookahead unit 121, and the data processing device 130 has the word string matching unit 131. The distance calculation unit 111 calculates, with respect to each frame in a temporal sequence of inputted speech features, distance values between the acoustic features in the frame and respective acoustic models, and writes it in the distance value buffer 141. The lookahead unit 121 reads out a distance value from the distance value buffer 142, and with respect to respective recognition units in each frame in the distance value buffer 142, calculates a lookahead value which is relative priority information thereof, and writes it in the lookahead buffer 151. The word string matching unit 131 reads out the distance values and the lookahead values of the frame from the distance value buffer 143 and the lookahead value buffer 152, performs word matching in frame synchronization by selecting matching words using the lookahead values of respective recognition units, and generates the recognition result of the whole speech.

Figure 2:
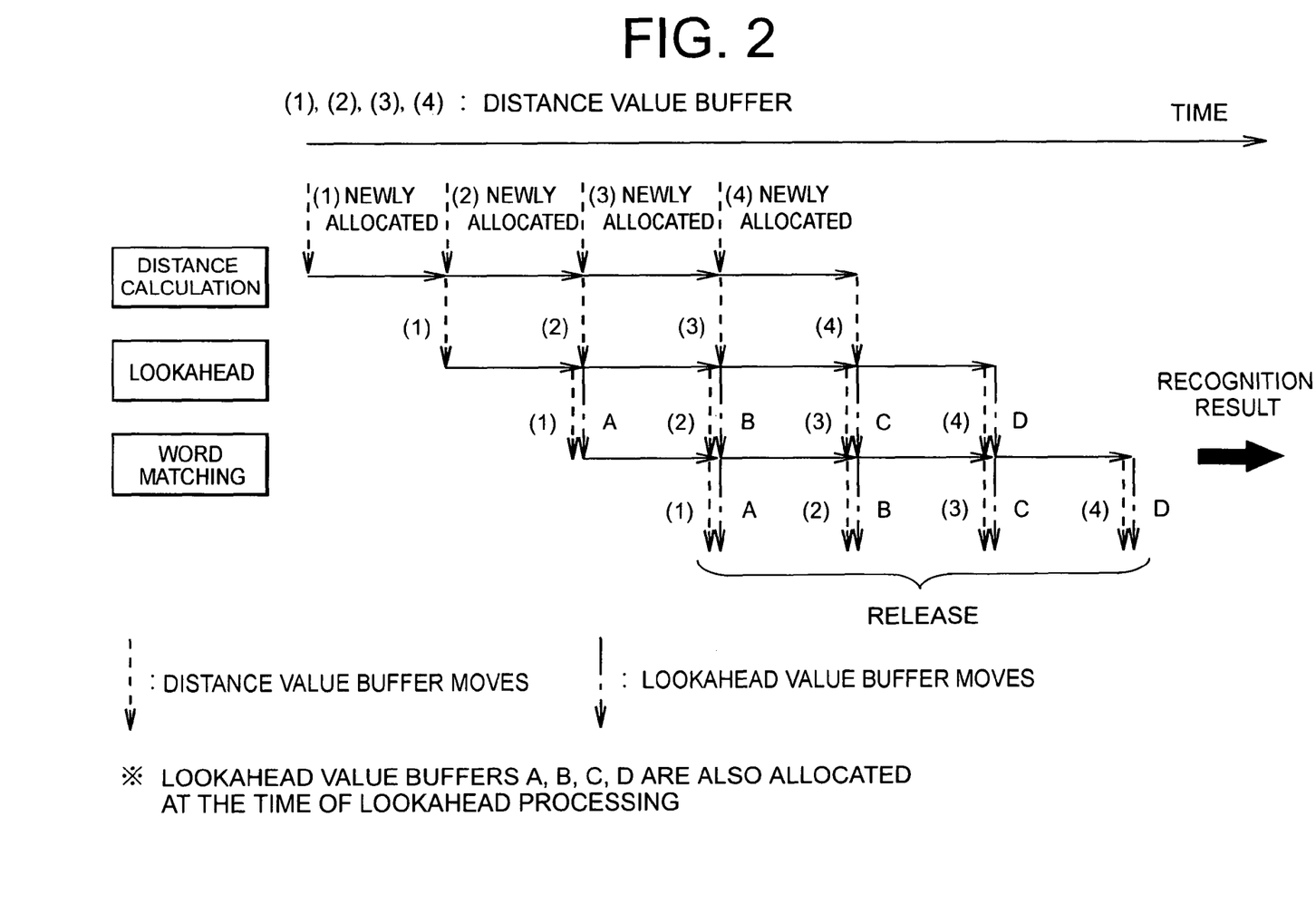
FIG. 2 is a time chart showing the operation of the speech recognition system of FIG. 1.

FIG. 2 is a time chart showing an operation of the speech recognition system 100. Hereinafter, an operation of the speech recognition system 100 will be described based on FIGS. 1 and 2.

At the beginning of processing, the distance calculation unit 111 allocates the distance value buffer 141 in the data storage device 140 ((1) in FIG. 2). Next, temporal sequence data of the acoustic features is supplied to the distance calculation unit 111 as an analyzed speech. Then, the distance calculation unit 111 calculates a distance value in synchronization with the temporal sequence of inputted acoustic features, and writes it in the distance value buffer 141. When the distance value buffer 141 becomes full, the distance value buffer 141 is moved to the tail of the distance value buffers 144, and a new distance value buffer 141 is allocated in the data storage device 140, and the processing is continued.

If the distance value buffer 142 is given, the lookahead unit 121 takes out a distance value of each frame therefrom, calculates a lookahead value with respect to respective recognition units in each frame, and writes it in the lookahead value buffer 151. When the lookahead buffer 151 becomes full, the distance value buffer 142 is moved to the tail of the distance value buffers 145, and further the lookahead value buffer 151 is moved to the tail of the lookahead value buffers 153. In this case and immediately after starting the operation, the distance value buffer 142 and the lookahead value buffer 151 are not provided. Therefore, ones at the heads are taken out from the distance value buffers 144 and are used as the distance value buffers 142, and the lookahead value buffer 151 is newly allocated in the data storage device 140, and the processing is continued.

Thereby, as shown by the distance value buffers (1), (2), (3) and (4) in FIG. 2, the distance value buffers processed by the distance calculation unit 111 are processed by the lookahead unit 121 in this order. In FIG. 2, A, B, C and D indicate lookahead value buffers corresponding to the distance value buffers (1), (2), (3) and (4), respectively.

When the distance value buffer 143 and the lookahead value buffer 152 are given, the word string matching unit 131 takes out the distance value of each frame and the lookahead value of respective recognition unit therefrom, and by selecting matching words using the lookahead value, performs word matching in frame synchronization to thereby generate a recognition result of one utterance. When all frames in the distance value buffer 143 and in the lookahead value buffer 152 has been processed, the distance value buffer 143 and the lookahead value buffer 153 release the memories. At this time and immediately after starting the operation, the distance value buffer 143 and the lookahead value buffer 152 are not provided, so ones at the heads are taken out from the distance value buffers 143 and the lookahead value buffers 153 (in FIG. 2, (1) and A, (2) and B, (3) and C, and (4) and D) and are used as the distance value buffers 143 and the lookahead value buffers 152 respectively, and the processing is continued. When there is no buffer to be taken out left in this state, it means the processing has advanced to the end of the utterance, so the recognition result up to the current point is outputted as the final speech recognition result.

According to the speech recognition system 100 of the present embodiment, the distance calculation unit 111, the lookahead unit 121 and the word string matching unit 131, which are three processing units, can perform processing in parallel independently. Therefore, the speech recognition speed is improved compared to the speech recognition system of the first conventional example.

Further, the speech recognition system 100 of the present embodiment can be summarized as follows. That is, the distance calculation unit 111 receives temporal sequence data of speech features, calculates the distance values between all of the acoustic models and speech features in respective frames in frame synchronization manner, and writes them in the distance value buffer 141. When the distance value buffer 141 becomes full, it is moved to the tail of the distance value buffers 144 which are to be delivered to the lookahead unit 121. The lookahead unit 121 receives the distance value buffer 142 from the distance value buffers 144, calculates a lookahead value which is a relative priority of each recognition unit in each frame, and writes it in the lookahead value buffer 151. When the lookahead value buffer 151 becomes full, it is moved to the tail of the distance value buffers 145 and the lookahead value buffers 153 to be delivered to the distance calculation unit 131 respectively. The word string matching unit 131 receives distance value buffers 143 and the lookahead value buffers 152 from the distance value buffers 145 and the lookahead value buffers 153, adequately selects matching words by using lookahead values to thereby recognize the entire utterance in frame synchronization, and generates a recognition result. By performing processing so that the respective path of multi-path speech recognition runs in parallel, speech recognition can be performed at high speed.

Figure 3:
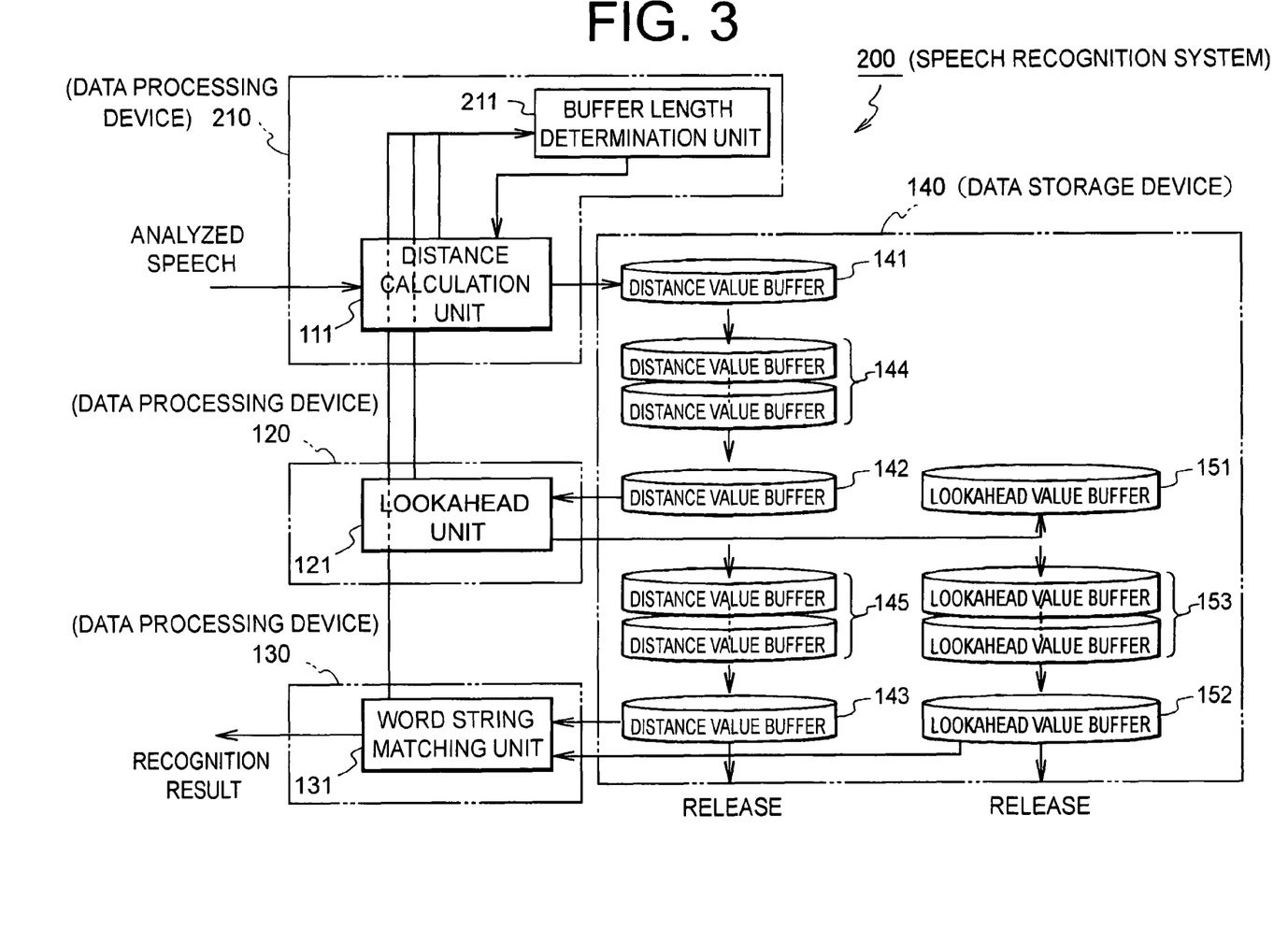
FIG. 3 is a block diagram showing the second embodiment of the speech recognition system according to the present invention.

FIG. 3 is a block diagram showing a second embodiment of the speech recognition system according to the present invention. Hereinafter, description will be given based on FIG. 3. However, the same components as those in FIG. 1 are denoted by the same reference numerals, so the descriptions thereof are omitted.

A speech recognition device 200 of the present embodiment is characterized as to include a buffer length determination unit 211. The buffer length determination unit 211 determines the buffer length of distance value buffers 141 to 145 or lookahead value buffers 151 to 153 so that the processing amounts of the distance calculation unit 111, the lookahead unit 121 and the word matching unit 131 become uniform. According to the present embodiment, the optimum buffer length relative to the speed is determined by the buffer length determination unit 211, whereby the recognition speed is improved.

Description will be given in more detail. The speech recognition device 200 is different in that the data processing device 210 includes the buffer length determination unit 211 in addition to the configuration of the data processing device 110 of FIG. 1. The buffer length determination unit 211 performs communications with the distance calculation unit 111, the lookahead unit 121 and the word string matching unit 131 to thereby calculate the optimum buffer length. For example, when the difference between the performance time per buffer of either one of the lookahead unit 121 and the word string matching unit 131 and the performance time per buffer of the distance calculation unit 111 becomes not less than a certain value, the buffer length determination unit 211 extends the buffer length by the amount of the difference. The distance calculation unit 111 receives the buffer length from the buffer length determination unit 211, and adjusts the length of the distance value buffer after the received time to become closer to the received buffer length, within a range of not discarding the already-calculated distance value. The operations other than that described above are same as those of the first embodiment.

Next, effects of the present embodiment will be described. In the case there is a lookahead unit 121, speed of the lookahead processing is improved by setting the length of a buffer to be longer, whereby the lookahead accuracy is also improved. Therefore, the speed of the word string matching unit 131 is also improved. In the present embodiment, when processing is delayed in the lookahead unit 121 or in the word string matching unit 131, the buffer length is made longer starting from that of the distance calculation unit 111 of the uppermost stream, whereby both of the lookahead unit 121 and the word string matching unit 131 can process at a higher speed. This enables to further uniform the processing amounts of the three processing units.

Figure 4:
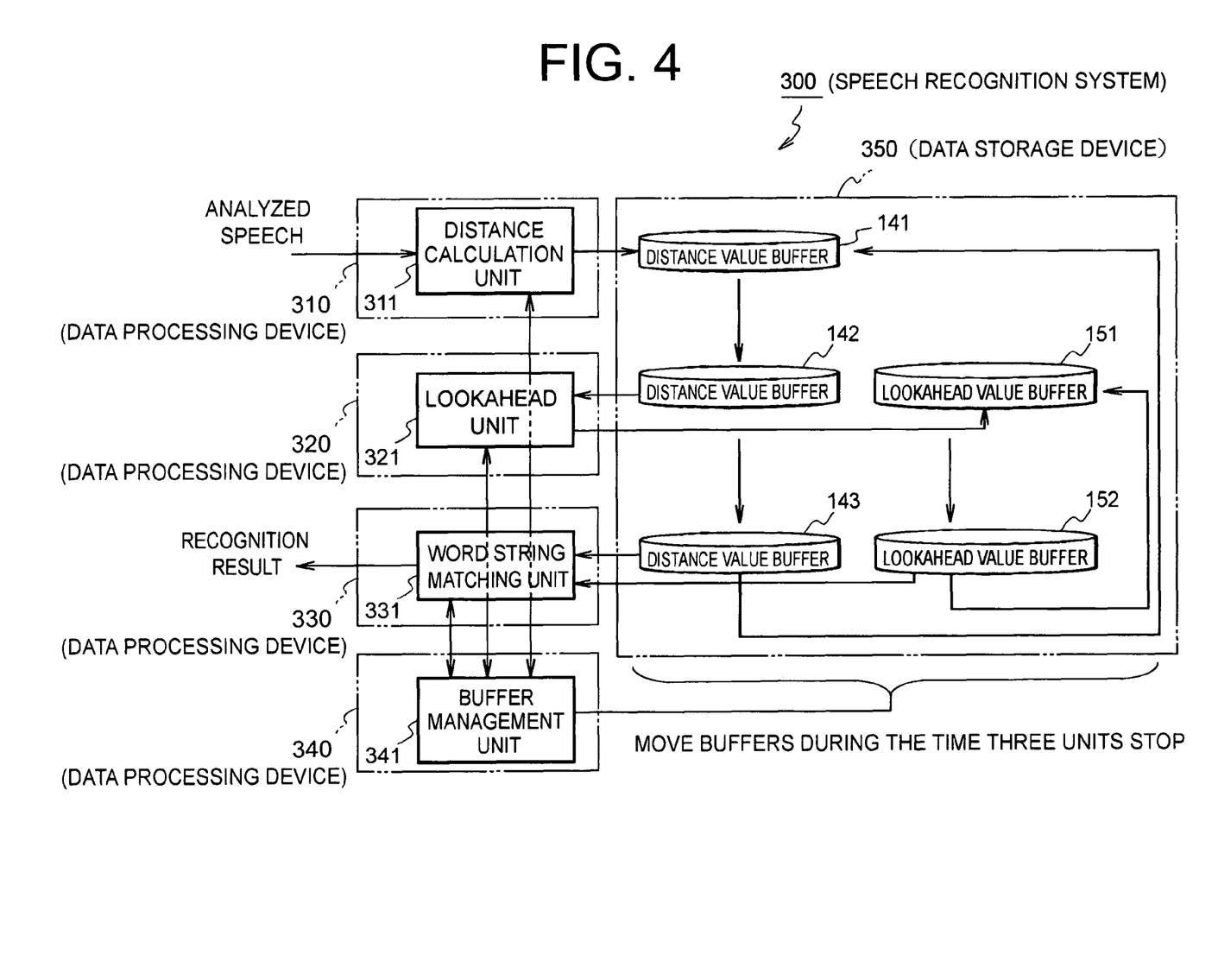
FIG. 4 is a block diagram showing the third embodiment of the speech recognition system according to the present invention.

FIG. 4 is a block diagram showing a third embodiment of the speech recognition system according to the present invention. Hereinafter, description will be given based on FIG. 4. However, the same components as those of FIG. 1 are denoted by the same reference numerals, so the descriptions thereof are omitted.

A speech recognition system 300 of the present embodiment is characterized as to include a buffer management unit 341. The buffer management unit 341 monitors operations of a distance calculation unit 311, a lookahead unit 321 and a word string matching unit 331. When the distance calculation unit 311 cannot write distance values in the distance value buffer 141 any more, and the lookahead unit 321 and the word string matching unit 331 read out all distance values from the distance value buffers 142 and 143, and the lookahead unit 321 cannot write lookahead values in the lookahead value buffer 151 any more, and further the word string matching unit 331 reads out all lookahead values from the lookahead value buffer 152, the buffer management unit 341 sets the distance value buffer 141 as one from which the lookahead unit 321 performs the next readout, sets the distance value buffer 142 as one from which the word string matching unit 331 performs the next readout, sets the distance value buffer 143 as one to which the distance calculation unit 311 performs the next writing, sets the lookahead value buffer 151 as one from which the word string matching unit 331 performs the next readout, and sets the lookahead value buffer 152 as one to which the lookahead unit 321 performs the next writing. According to the present embodiment, the effect of the present invention can be achieved with the minimum number of buffers.

Description will be given in more detail. The speech recognition system 300 includes data processing units 310, 320, 330 and 340 operated by program controls, and a data storage device 350 for storing information.

The data storage device 350 includes distance value buffers 141, 142 and 143 and the lookahead value buffers 151 and 152. Each of the distance value buffers 141, 142 and 143 are buffers corresponding to a speech of a frame section, storing the distance values between respective acoustic models and the inputted speech features at each frame. Each of the lookahead value buffers 151 and 152 is a buffer corresponding to the speech and the distance value of a frame section, storing a lookahead value which is a relative priority associated with respective recognition units calculated from acoustic information after the frame.

The data processing device 310 includes the distance calculation unit 311, the data processing device 320 includes the lookahead unit 321, the data processing device 330 includes the word string matching unit 331, and the data processing device 340 includes the buffer management unit 341. The distance calculation unit 331 receives a temporal sequence of input acoustic features, calculates the distance values between the acoustic features in each frame and respective acoustic models, and writes them into the distance value buffer 141. The lookahead unit 321 reads out distance values from the distance value buffer 142, calculates lookahead values that are relative priority information of respective recognition units in each frame in the buffer, and writes them in the lookahead value buffer 151. The word string matching unit 331 reads out the distance values and the lookahead values in the frames from the distance value buffer 143 and the lookahead value buffer 152, and performs word matching in frame synchronization by selecting matching words using the lookahead values of respective recognition units, to thereby generate a recognition result to the entire utterance.

Next, an operation of the speech recognition system 300 will be described. A temporal sequence of acoustic features as an analyzed speech is supplied to the distance calculation unit 311. The distance calculation unit 311 calculates distance values in synchronization with the input acoustic temporal sequence, and writes them in the distance value buffer 141. When the distance value buffer 141 becomes full, the unit enters a waiting state. If the distance value buffer 142 is provided, the lookahead unit 321 takes out distance values of each frame therefrom, calculates the lookahead values of respective recognition units in each frame, and writes them in the lookahead value buffer 151. When the lookahead value buffer 151 becomes full, the unit enters a waiting state.

If the distance value buffer 143 and the lookahead value buffer 152 are provided, the word string matching unit 331 takes out the distance values of each frame and the lookahead values of respective recognition units therefrom, and performs word matching in frame synchronization by adequately selecting matching words by using the lookahead values, to thereby generate a recognition result of one utterance. When all frame data in the distance value buffer 143 and the lookahead value buffer 152 are processed, the unit enters a waiting state.

The buffer management unit 341 monitors the status of the distance calculation unit 311, the lookahead unit 321 and the word string matching unit 331, and when all of them are in the waiting state, moves the distance value buffer 141 to the distance value buffer 142, moves the distance value buffer 142 to the distance value buffer 143, and moves the distance value buffer 143 to the distance value buffer 141, and exchanges the lookahead value buffer 151 and the lookahead value buffer 152. Then, the buffer management unit 341 releases the distance calculation unit 331, the lookahead unit 321 and the word string matching unit 331 from the waiting state.

When there is no data to be processed left in the distance value buffer 143 and in the lookahead value buffer 152, it means the processing has advanced to the end of the utterance. Therefore, the word string matching unit 331 outputs the recognition result up to the current point as the final speech recognition result.

According to the speech recognition system 300 of the present embodiment, three processing units, that is, the distance calculation unit 311, the lookahead unit 321 and the word string matching unit 331, can process in parallel independently. Therefore, the speech recognition speed can be improved compared with that of the speech recognition system of the first conventional example.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2005-008542, filed on Jan. 17, 2005, the disclosure of which is incorporated herein in its entirety by reference.

What is claimed is:

1. A speech recognition system, comprising:
   a distance calculation unit which generates a distance value between speech features, inputted sequentially, and each acoustic model;
   an acoustic lookahead unit which generates an acoustic lookahead value by using the distance value previously generated by the distance calculation unit, in parallel with generation of the distance value by the distance calculation unit;
   a word string matching unit which performs word matching by using the distance value previously generated by the distance calculation unit and the acoustic lookahead value previously generated by the acoustic lookahead unit to thereby generate a recognition result, in parallel with generation of the distance value by the distance calculation unit and generation of the acoustic lookahead value by the acoustic lookahead unit.

2. The speech recognition system, according to claim 1, further comprising:
- distance value buffers which store distance values generated by the distance calculation unit; and
- acoustic lookahead value buffers which store acoustic lookahead values generated by the acoustic lookahead unit, wherein
- in each of the distance value buffers, operations of writing the distance value from the distance calculation unit, reading out the distance value to the acoustic lookahead unit, and reading out the distance value to the word string matching unit are performed,
- in each of the acoustic lookahead value buffers, operations of writing the acoustic lookahead value from the acoustic lookahead unit and reading out the acoustic lookahead value to the word string matching unit are performed,
- wherein, at any point in time, the distance value buffer in which the distance value from the distance calculation unit is written, the distance value buffer from which the distance value to the acoustic lookahead unit is read out, and the distance value buffer from which the distance value to the word string matching unit are read out, are different from one another, and
- the acoustic lookahead value buffer in which the acoustic lookahead value from the acoustic lookahead unit is written and the acoustic lookahead value buffer from which the acoustic lookahead value to the word string matching unit is read out are different from each other.

3. The speech recognition system according to claim 2, further comprising a buffer length determination unit which determines a buffer length of the distance value buffer or the acoustic lookahead value buffer so that processing amounts of the distance calculation unit, the acoustic lookahead unit and the word string matching unit become uniform.

4. The speech recognition system according to claim 2, wherein the buffer management unit includes:
- a function of monitoring operations of the distance calculation unit, the acoustic lookahead unit and the word string matching unit; and
- on conditions that the distance calculation unit cannot write the distance values in the distance value buffers any more, the acoustic lookahead unit and the word string matching unit read out all of the distance values from the distance value buffers, the acoustic lookahead unit cannot write the acoustic lookahead values in the acoustic lookahead value buffers any more, and the word string matching unit read out all of the acoustic lookahead values from the acoustic lookahead value buffers,
- a function of operating: the distance value buffer used for writing by the distance calculation unit as a next one from which the acoustic lookahead unit reads out; the distance value buffer used for reading by the acoustic lookahead unit as a next one from which the word string matching unit reads out; the distance value buffer used for reading by the word string matching unit as a next one into which the distance calculation unit writes; the acoustic lookahead value buffer used for writing by the acoustic lookahead unit as a next one from which the word string matching unit reads out; and the acoustic lookahead value buffer used for reading by the word string matching unit as a next one into which the acoustic lookahead unit writes.

5. A speech recognition method, comprising:
- a distance calculation step to generate, by at least one computer, a distance value between speech features, inputted sequentially, and respective acoustic models;
- an acoustic lookahead step to generate, by the at least one computer, an acoustic lookahead value by using the distance value previously generated in the distance calculation step, in parallel with generation of the distance value in the distance calculation step;
- a word string matching step to perform, by the at least one computer word matching by using the distance value previously generated in the distance calculation step and the acoustic lookahead value previously generated in the acoustic lookahead step, and to generate a recognition result, in parallel with generation of the distance value in the distance calculation step and generation of the acoustic lookahead value in the acoustic lookahead step.

6. The speech recognition method according to claim 5, in which distance value buffers which store distance values generated in the distance calculation step and acoustic lookahead value buffers which store acoustic lookahead values generated in the acoustic lookahead step are used, the method further comprising:
- to the distance value buffers, performing writing of the distance value in the distance calculation step, reading of the distance value in the acoustic lookahead step, and reading of the distance value in the word string matching step, in parallel;
- to the acoustic lookahead value buffers, performing writing of the acoustic lookahead value in the acoustic lookahead step and reading of the acoustic lookahead value in the word string matching step, in parallel; and
- causing, at any point in time, the distance value buffer in which the distance value is written in the distance calculation step, the distance value buffer from which the distance value is read out in the acoustic lookahead step, and the distance value buffer from which the distance value is read out in the word string matching step to be different from one another, and causing the acoustic lookahead value buffer in which the acoustic lookahead value is written in the acoustic lookahead step and the acoustic lookahead value buffer from which the acoustic lookahead value is read out in the word string matching step, to be different from each other.

7. The speech recognition method, according to claim 6, further comprising: determining, by the at least one computer, a buffer length of the distance value buffer or the acoustic lookahead value buffer so as to uniform processing amounts of the distance calculation step, the acoustic lookahead step and the word string matching step.

8. The speech recognition method, according to claim 6, further comprising a buffer management step to monitor operations in the distance calculation step, the acoustic lookahead step and the word string matching step, wherein
- in the buffer management step, on conditions that the distance values cannot be written in the distance value buffers any more in the distance calculation step, and all of the distance values are read out from the distance value buffers in the acoustic lookahead step and in the word string matching step, and the acoustic lookahead values cannot be written any more in the acoustic lookahead value buffers in the acoustic lookahead step, and all of the acoustic lookahead values are read out from the acoustic lookahead value buffers in the word string matching step,
- operating: the distance value buffer used for writing in the distance calculation step as a next one for reading in the acoustic lookahead step; the distance value buffer used for reading in the acoustic lookahead step as a next one for reading in the word string matching step; the distance value buffer used for reading in the word string matching step as a next one for writing in the distance calculation step; the acoustic lookahead value buffer used for writing in the acoustic lookahead step as a next one for reading in the word string matching step; and the acoustic lookahead value buffer used for reading in the word string matching step as a next one for writing in the acoustic lookahead step.

9. A non-transitory computer readable medium storing a speech recognition program causing a computer constituting a speech recognition system to perform:
   a function of generating a distance value between the speech feature, inputted sequentially, and each acoustic model;
   a function of generating an acoustic lookahead value by using the distance value previously generated when the distance values are continuously generated; and
   a function of performing word string matching by using the distance value previously generated and the acoustic lookahead value previously generated, and generating a recognition result when the distance values are continuously generated and when the acoustic lookahead values are continuously generated.

10. The non-transitory computer readable medium, according to claim 9, causing functions of distance value buffers for reading and writing the distance values generated and functions of acoustic lookahead value buffers for reading and writing the acoustic lookahead values generated to be performed,
   causing functions of reading and writing by the distance value buffers to be performed in parallel, and causing functions of reading and writing by the acoustic lookahead value buffers to be performed in parallel;
   wherein, at any point in time, the distance value buffer in which the distance value from the distance calculation unit is written, the distance value buffer from which the distance value to the acoustic lookahead unit is read out, and the distance value buffer from which the distance value to the word string matching unit are read out, are difference from one another, and
   wherein the acoustic lookahead value buffer in which the acoustic lookahead value from the acoustic lookahead unit is written and the acoustic lookahead value buffer from which the acoustic lookahead value to the word string matching unit is read out are different from each other.

11. The non-transitory computer readable medium, according to claim 10, causing a function of determining a buffer length of the distance value buffer or the acoustic lookahead value buffer to be performed so that processing amounts of the distance calculation unit, the acoustic lookahead unit and the word string matching unit become uniform.

12. The non-transitory computer readable medium, according to claim 10, causing a buffer management function to monitor operations of the distance calculation unit, the acoustic lookahead unit and the word string matching unit to be performed, wherein
   on conditions that the distance values cannot be written in the distance value buffers any more, and all of the distance values are read out from the distance value buffers, and the acoustic lookahead unit cannot write the acoustic lookahead values any more in the acoustic lookahead value buffers, and the word string matching unit reads out all of the acoustic lookahead values from the acoustic lookahead value buffers,
   the buffer management function causes: the distance value buffer used for writing by the distance calculation unit to work as a next one from which the acoustic lookahead unit reads out; the distance value buffer used for reading by the acoustic lookahead unit to work as a next one from which the word string matching unit reads out; the distance value buffer used for reading by the word string matching unit to work as a next one into which the distance calculation unit writes; the acoustic lookahead value buffer used for writing by the acoustic lookahead unit to work as a next one from which the word string matching unit reads out; and
   the acoustic lookahead value buffer used for reading by the word string matching unit to work as a next one into which the acoustic lookahead unit writes.

13. A speech recognition system which performs speech recognition by using:
   a distance calculation unit which generates a distance value between speech features and each acoustic model;
   an acoustic lookahead unit which generates an acoustic lookahead value by using the distance value; and
   a word string matching unit which performs word matching by using the distance value and the acoustic lookahead value to thereby generate a recognition result, wherein
   at least two units among the distance calculation unit, the acoustic lookahead unit and the word string matching unit perform parallel processing.

14. A speech recognition method to perform speech recognition by generating a distance value between speech features and each acoustic model, generating, by at least one computer, an acoustic lookahead value by using the distance value, and performing, by the at least one computer., word matching by using the distance value and the acoustic lookahead value and generating a recognition result, wherein
   at least two kinds of processing among processing to generate the distance value, processing to generate the acoustic lookahead value and processing to generate the recognition result are performed by the at least one computer in parallel.

15. A speech recognition system which performs speech recognition by using:
   a distance calculation means which generates a distance value between speech features and each acoustic model;
   an acoustic lookahead means which generates an acoustic lookahead value by using the distance value; and
   a word string matching means which performs word matching by using the distance value and the acoustic lookahead value to thereby generate a recognition result, wherein at least two means among the distance calculation means, the acoustic lookahead means and the word string matching means performs parallel processing.

16. A speech recognition system comprising:
   a distance calculation means which generates a distance value between speech features, inputted sequentially, and each acoustic model;
   an acoustic lookahead means which generates an acoustic lookahead value by using the distance value previously generated by the distance calculation means, in parallel with generation of the distance value by the distance calculation means;
   a word string matching means which performs word matching by using the distance value previously generated by the distance calculation means and the acoustic lookahead value previously generated by the acoustic lookahead means to thereby generate a recognition result, in parallel with generation of the distance value by the distance calculation means and generation of the acoustic lookahead value by the acoustic lookahead means.

* * * * *